(12) United States Patent
Eidsmore

(10) Patent No.: US 7,712,486 B2
(45) Date of Patent: *May 11, 2010

(54) MODULAR SURFACE MOUNT MANIFOLD

(75) Inventor: Paul E. Eidsmore, Santa Cruz, CA (US)

(73) Assignee: Swagelok Company, Solon, OH (US)

( * ) Notice: Subject to any disclaimer, the term of this patent is extended or adjusted under 35 U.S.C. 154(b) by 136 days.

This patent is subject to a terminal disclaimer.

(21) Appl. No.: 12/150,508

(22) Filed: Apr. 29, 2008

(65) Prior Publication Data
US 2008/0202615 A1 Aug. 28, 2008

Related U.S. Application Data

(60) Continuation of application No. 11/685,486, filed on Mar. 13, 2007, now Pat. No. 7,404,417, which is a continuation of application No. 11/194,409, filed on Aug. 1, 2005, now Pat. No. 7,195,037, which is a continuation of application No. 10/605,268, filed on Sep. 18, 2003, now Pat. No. 6,938,644, which is a division of application No. 09/719,727, filed as application No. PCT/US99/04972 on Mar. 5, 1999, now Pat. No. 6,644,353.

(60) Provisional application No. 60/076,871, filed on Mar. 5, 1998.

(51) Int. Cl.
F16K 11/10 (2006.01)
(52) U.S. Cl. ...................................... 137/884
(58) Field of Classification Search ................. 137/269, 137/270, 271, 597, 884; 285/125.1
See application file for complete search history.

(56) References Cited

U.S. PATENT DOCUMENTS

| 4,687,020 | A | * | 8/1987 | Doyle | 137/486 |
|---|---|---|---|---|---|
| 5,771,919 | A | * | 6/1998 | Itoi et al. | 137/454.6 |
| 6,039,360 | A | * | 3/2000 | Ohmi et al. | 285/61 |
| 6,283,155 | B1 | * | 9/2001 | Vu | 137/884 |
| 6,345,642 | B1 | * | 2/2002 | Yoshidome et al. | 137/240 |
| 6,374,859 | B1 | * | 4/2002 | Vu et al. | 137/884 |
| 6,382,238 | B2 | * | 5/2002 | Ishii et al. | 137/271 |
| 6,418,960 | B1 | * | 7/2002 | Mintz et al. | 137/242 |
| 6,502,601 | B2 | * | 1/2003 | Eidsmore et al. | 137/884 |
| 6,546,960 | B1 | * | 4/2003 | Rohrberg et al. | 137/884 |
| 6,546,961 | B2 | * | 4/2003 | Fukushima | 137/884 |
| 6,554,020 | B2 | * | 4/2003 | Yamaji et al. | 137/341 |

* cited by examiner

Primary Examiner—John Fox
(74) Attorney, Agent, or Firm—Calfee, Halter & Griswold LLP

(57) ABSTRACT

A modular manifold system is provided for interconnecting fluid components of a fluid system in a reduced area. The system is comprised of a one or more bridge fittings having an internal fluid passageway which has an inlet end in fluid communication with an outlet port of a first fluid component, and an outlet end in fluid communication with an inlet port of a second fluid component. The bridge fittings may be mounted within a channel of a backing plate for structural support. An optional locator plate may be utilized which is mounted over the ends of the bridge fittings in order to align the inlet and outlet ports of the fluid components with the inlet and outlet ends of the bridge fittings. The bridge fittings may also be mounted to the locator plate in multiple directions forming multiple flow paths. Additionally, the bridge fittings may be stacked to form multiple layers where bridge fittings of one layer may be in fluid communication with bridge fittings of another layer. The invention may further comprise seals provided in a recess between the fluid ports and the mating bridge fittings ends.

5 Claims, 4 Drawing Sheets

MODULAR SURFACE MOUNT MANIFOLD

RELATED APPLICATIONS

The present application is a continuation of pending U.S. Ser. No. 11/685,486 filed on Mar. 13, 2007, for MODULAR SURFACE MOUNT MANIFOLD, which application is pending issue, which is a continuation of U.S. Ser. No. 11/194,409 filed on Aug. 1, 2005, for MODULAR SURFACE MOUNT MANIFOLD, now U.S. Pat. No. 7,195,037, which is a continuation of U.S. Ser. No. 10/605,268 filed on Sep. 18, 2003, for MODULAR SURFACE MOUNT MANIFOLD, now U.S. Pat. No. 6,938,644, which is a divisional application of U.S. Ser. No. 09/719,727 filed on Jun. 7, 2001, for MODULAR SURFACE MOUNT MANIFOLD, now U.S. Pat. No. 6,644,353, itself a national phase entry under 35 U.S.C. §371 and claims priority to International Application No. PCT/US99/04972, with an International Filing Date of Mar. 5, 1999, for MODULAR SURFACE MOUNT MANIFOLD which claims the benefit of U.S. Provisional Application Ser. No. 60/076,871, filed Mar. 5, 1998, for MODULAR SURFACE MOUNT MANIFOLD which are all fully incorporated by reference herein.

FIELD OF THE INVENTION

The invention relates in general to manifolds for fluid systems, and more particularly, the invention relates to a modular gas distribution system for use in high purity fluid systems and corrosive fluid systems such as the clean room environment used to manufacture semiconductor wafers.

BACKGROUND OF THE INVENTION

This application claims the benefit of U.S. provisional application No. 60/076,871 filed on Mar. 5, 1998.

To manufacture semiconductors, the industry uses various high purity gases. These gases are controlled by systems made up of high purity valves, regulators, pressure transducers, mass flow controllers and other components connected together by welding and high purity metal seal fittings. These connections are undesirable in many applications because they add additional time and cost for welding operations, unnecessary space between components and make it difficult to replace a component located between other components. Further, these systems are typically custom designed and manufactured which make the manufacturing costs and procurement of replacement parts quite expensive.

New modular manifold systems have been recently introduced into the industry in order to overcome these problems. Typical components of these systems such as valves, pressure regulators and other typical fluid components have been reconfigured so that their inlet and outlet ports and attachment mechanisms are compatible with surface mount manifolds. These manifolds are typically comprised of modular blocks which are machined of high purity metal and have machined internal flow passageways. These prior art modular systems typically utilize a metallic seal between the component and a modular block face to ensure near leak-free seal integrity. One objective of such systems is to use surface mount standard configurations based upon industry standards to permit interchangeability of surface mount components.

One disadvantage to these type of prior art modular systems is that the entire modular block is made of high purity metal. Thus money and natural resources are inefficiently utilized. Further, these block components also have higher manufacturing costs due to the complexity of machining multiple passageways of a single block as well as a higher risk of expensive scrap being formed due to the manufacturing complexity. Further, the mating blocks require the use of mating seals therebetween, which require additional manufacturing time, and further require proper installation and makeup torque of the fastener members in order to ensure a leak-tight seal.

SUMMARY OF THE INVENTION

Thus it is desired that a modular manifold design be provided which eliminates the seals between modular mating blocks, dramatically reduces the amount of expensive material utilized, and results in a simpler and cheaper system to manufacture while providing a reduced system footprint or envelope which meets or surpasses the performance, integrity and reliability of existing systems.

The invention provides in one aspect a bridge fitting for use in a fluid manifold system for being in fluid communication with two or more fluid components, such as valves, regulators, pressure transducers, mass flow controllers, and the like. The bridge fitting comprises a first elbow fitting connected to a second elbow fitting, with the connected elbow fittings having an internal fluid passageway therethrough. The internal passageway of the bridge fitting has an inlet end and an outlet end, with the inlet end in fluid communication with an outlet port of the first fluid component, and the outlet end of the bridge fitting in fluid communication with an inlet end of a second fluid component.

The invention provides in another aspect a bridge fitting for use in a fluid manifold system for being in fluid communication with three or more fluid components, wherein one or more of said fluid components has a single port. The bridge fitting comprises a first and second elbow fitting having a respective end connected to a tee fitting. The tee fitting is located between the elbow fittings, with each of the elbow fittings and the tee fittings having an internal fluid passageway in fluid communication with each other. The internal passageway of the fittings have an inlet end and a first and second outlet end, with the inlet end in fluid communication with an outlet port of the first fluid component, and the outlet ends of the fluid passageway being in fluid communication with an inlet end of a second and third fluid component, respectively.

The invention provides in yet another aspect a modular fluid manifold system for connecting with one or more surface mount type fluid components having an inlet port and an outlet port, the modular system comprising: one or more bridge fittings having an internal fluid passageway therethrough; the internal passageway of the bridge fitting having an inlet end for connecting to an outlet port of the first fluid component, and an outlet end for connecting to an inlet port of the second fluid component, whereby the internal fluid passageway of the bridge fitting is in fluid communication with the first and second fluid components when the system is assembled.

Finally, the invention provides a modular fluid manifold system for connecting with one or more fluid components comprising an inlet port and one or more outlet ports. The manifold system comprises one or more bridge fittings having an inlet end and an outlet end and an internal passageway joining said ends therethrough. The system further includes a locator plate having an upper surface for mounting the fluid components thereon and a plurality of holes aligned with the inlet and outlet ports of the fluid components. The locator plate has a lower surface for mounting the bridge fittings thereto. The inlet end of each of the bridge fittings are in fluid communication with an outlet port of a fluid component, and an outlet end of each of the bridge fittings are in fluid communication with an inlet port of another fluid component.

These and other features and advantages of the invention will become apparent in the detailed description and claims to follow, taken in conjunction with the accompanying figures.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein:

FIG. 3b is a cross-sectional view of an alternative gas bridge incorporating a tee fitting and an additional tube section, in addition to the two elbows and the tube section shown in the complete gas bridge 8 illustrated in FIGS. 3 and 3a.

DETAILED DESCRIPTION OF THE INVENTION

Figure 1:
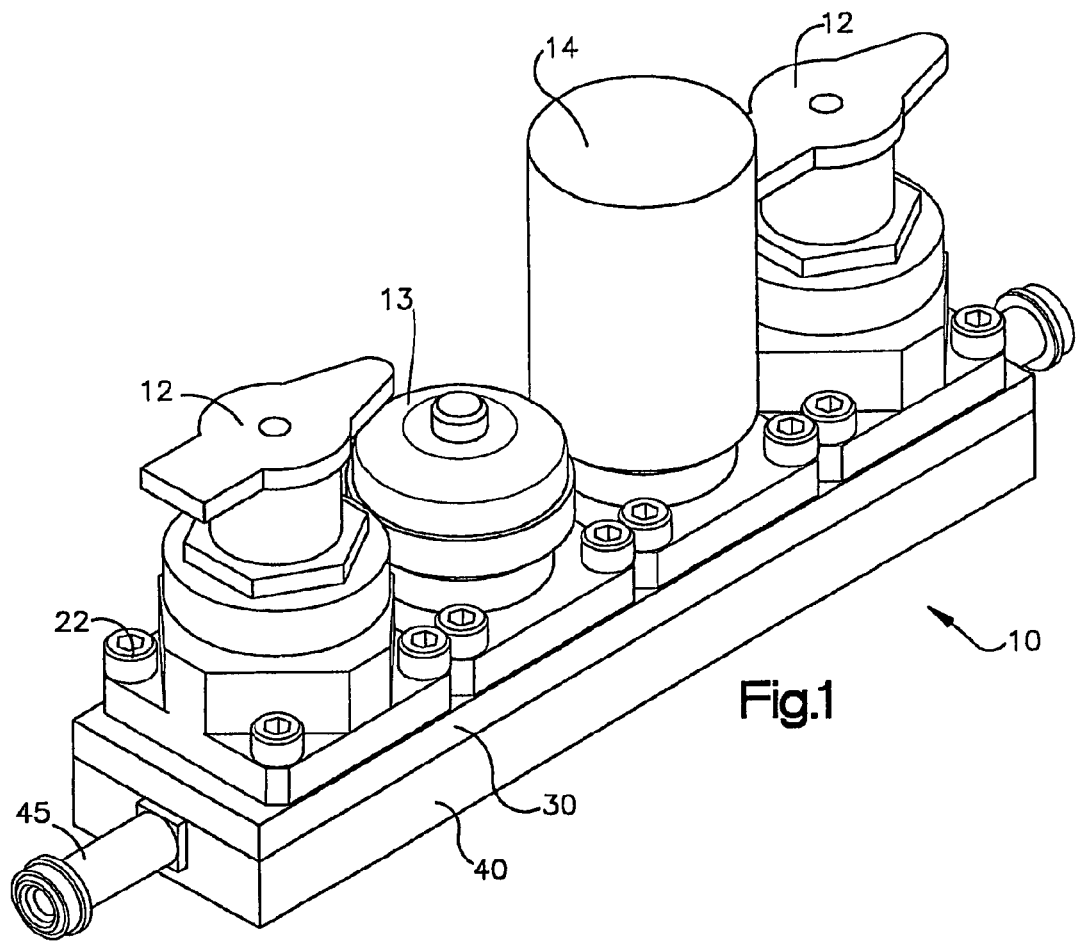
FIG. 1 is a perspective view of the complete manifold assembly shown with representative components and seals incorporating features of the subject invention.

Referring now to the drawings wherein the drawings are for the purposes of illustrating the preferred embodiments of the invention only and not for purposes of limiting same, a unique manifold system is shown in the FIGS. 1-4. The inventions as shown and described in the Figures are useful, for example, as part of a high purity modular gas distribution system used in the manufacture of semiconductor devices or other fluid systems which must withstand corrosive fluids. The present invention is not limited to the use in high purity fluid systems, and may be useful in any application relating to fluid flow control.

Now referring to the drawings and more particularly FIG. 1, a modular fluid manifold system 10 is shown assembled together with fluid flow control components such as valves 12, flow regulators 13, filters 14 and the like. The fluid components may be utilized in conjunction with the invention, but are not part of the invention. The fluid components 12-14 are preferably surface mount type components, and each component has an inlet port 16 and may additionally comprise one or more outlet ports 18 as shown in FIG. 3A, which allow fluid communication to the fluid component. A series of fasteners 22 of the fluid components pass through openings 24 in the base flanges 26 of the fluid components in order to secure the components to the modular manifold system 10.

The modular manifold system 10 of the present invention may comprise one or more bridge fittings 50, an optional locator plate 30, an optional backing plate 40, optional end fittings 45, and optional sealing elements 60. These elements are described in more detail, below. The bridge fittings 50, as shown in FIG. 3, are in the form of two elbow fittings 52 which are shown joined by an optional tubular extension 54 connected to the respective ends of the elbow fittings 52 by conventional means such as by orbital welding. The elbow fittings 52 have an interior fluid passageway 56 having an inlet end 58 and an outlet end 62,64, with the inlet end 58 having a 90 degree orientation with respect to the outlet end 62,64. The optional tubular extension 54 has an internal fluid passageway which connects with the adjoining fluid passageway of the two adjacent elbow end fittings 52, such that a U shaped fluid passageway is formed within the interior of the bridge fitting 50, with the passageway having an inlet end 62 and an outlet end 64. As shown in FIG. 3A, the inlet end 62 of the bridge fitting 50 is in fluid communication with a respective outlet opening 18 of a fluid component 12, and the outlet end 64 of the bridge fitting 50 is in fluid communication with the inlet of an adjacent fluid component 13. Thus the bridge fitting 50, acts as a "bridge" to transfer fluid between adjacent fluid components such as 12,13 without the need for metal to metal seals between adjacent bridge fittings 50, which is typically required by the mating of adjacent prior art modular blocks. It is preferred that the bridge fitting 50 be comprised of stainless steel such as 316 or SCQ, or other material suitable for use in conjunction with semiconductor processing fluids. For typical industrial applications, any suitable material such as plastic or metal would work for the invention.

As shown in FIG. 1, the modular system 10 may also comprise end fittings 45, which comprise an elbow fitting having a 90 degree internal passageway connected to a standard fitting 46, such as a standard VCR-type fitting or other suitable fitting for connecting with a fluid line. The end fitting 45 may be utilized as an inlet fitting or an outlet fitting which mates with the fluid line (not shown). Thus, the outlet or inlet end of the elbow fitting is connected to the respective inlet or outlet end of a fluid component. It is preferred that the end fittings 45 be comprised of stainless steel, 316 stainless, SCQ stainless or other material suitable for use in conjunction with semiconductor processing fluids. For typical industrial applications, the end fittings 45 may be comprised of any suitable material such as plastic or metal.

The modular manifold system 10 of the present invention may further optionally comprise a backing plate 40. The backing plate 40 may comprise a flat plate, but it preferably has an interior groove or channel 42 for receiving and securing a plurality of bridge fittings 50 and end fittings 45 therein. Each elbow fitting 52 of the bridge fitting 50 and the end fitting 45, has an exterior shaped body of a precise dimension which mates with the shape of the groove or channel 42. It is preferred but not required that the external shape of the elbow fitting 52 be rectangular or square. It is also preferred that the internal side walls 44 forming the channel 42 have a suitable dimension for closely receiving a square shaped body, or that two of the opposed side walls have an appropriate dimension for receiving a rectangular shaped body. The invention is not limited to the above mentioned shapes, as any complementary shaped channel with respect to the shaped body of the elbow fitting 52 would work for the invention. The backing plate 40 may be comprised of any suitable material such as metal, but it is preferably made of a low-cost lightweight material such as aluminum.

In one embodiment of the invention (not shown), the channel 42 is of a sufficient depth such that the bridge fittings 50 and the end fittings 45 can be completely received within the channel 42 such that a recess is formed (not shown) for receiving a seal 60 between the inlet 62 and outlet 64 of the bridge fittings and the opposed channel walls 44. In order to assemble the system in this embodiment, the bridge fittings 50 are inserted within the channel 42 of the backing plate 40, such that the bridge fittings 50 are spaced to have minimal clearance between adjoining bridge fittings 52. Next, the inlet and outlet ports of the fluid components 12-14 are carefully aligned with the respective outlet and inlet ports of the pertinent bridge fittings. For example, an inlet end of a first bridge fitting 50 is aligned for fluid communication with an outlet of a first fluid component. Next, the outlet end of the first bridge fitting 50 is aligned with the inlet of a second fluid component which is adjacent to the first fluid component. After the inlet and outlet ports are carefully aligned, the fasteners 22 are inserted through holes 24 of the flanges 26 of the fluid components and into mating holes (not shown) of the backing plate 40, such that the fluid components are secured to the backing plate 40.

It is preferable that the manifold system 10 further comprise seals 60, which are received between the mating inlet/outlet ports of the bridge fittings 50 and the fluid components. The seals 60 may be made of any suitable material such as elastomer, plastic, rubber or polymer material and preferably, a soft metal such as nickel. C seals may also be used, as well as composite seals to name additional examples. Other seal technologies which may used in conjunction with the invention will be readily apparent to those ordinarily skilled in the art.

Figure 2:
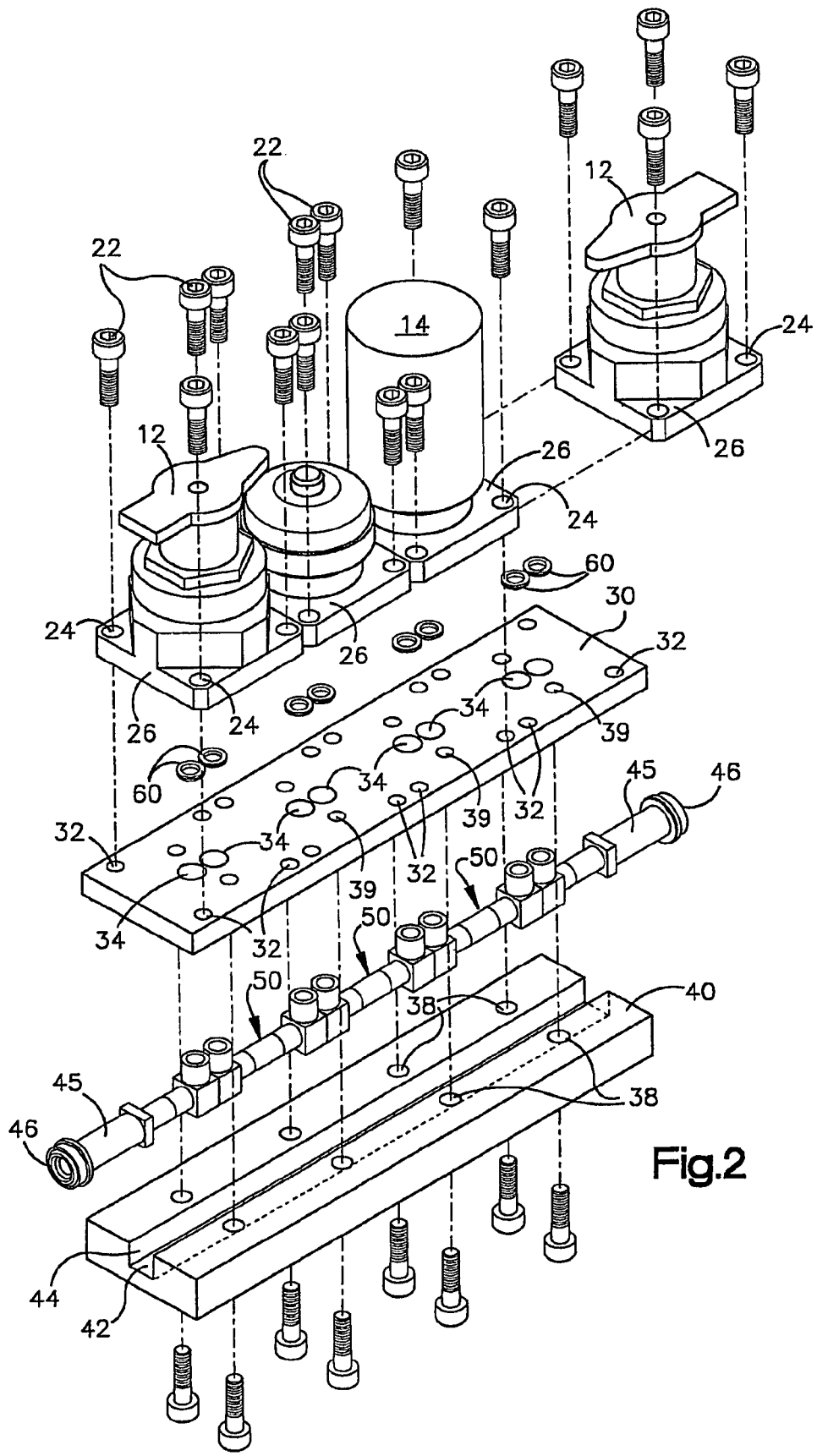
FIG. 2 is an exploded perspective of a manifold assembly and representative components and seals incorporating features of the subject invention as shown in FIG. 1.

In a second embodiment of the invention as illustrated in FIGS. 2, 3 and 3A, an optional locator plate 30 may be utilized with the invention. The locator plate 30 has a plurality of holes aligned to receive the ends 62,64 of the bridge fittings 50 therein. The ends of the bridge fittings 50 are preferably slightly shorter than the thickness of the locator plate 30 such that a recess is formed for receiving a seal 60 therein. The locator plate 30 additionally has holes 32 aligned for receiving fasteners 22 therein. Thus in order to assemble the system pursuant to the second embodiment of the invention, the bridge fittings are placed within the channel 42 of the backing plate 40, and then the holes of the locator plate are aligned with the inlet and outlet end of the bridge fittings 50. The locator plate is then lowered into position such that the ends of bridge fittings 50 are inserted through the aligned holes 34 of the locator plate 30. Fasteners 36 are then inserted through aligned holes 38 of the backing plate for reception into aligned holes 39 of the locator plate 30. Lastly, the fluid components 12-14 are then secured to the locator plate 30 using fasteners 22.

Figure 3B:
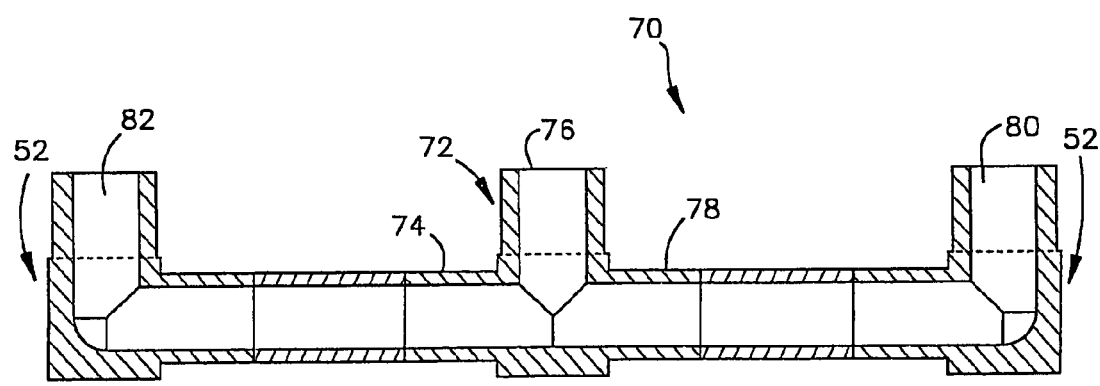
Figure 3:
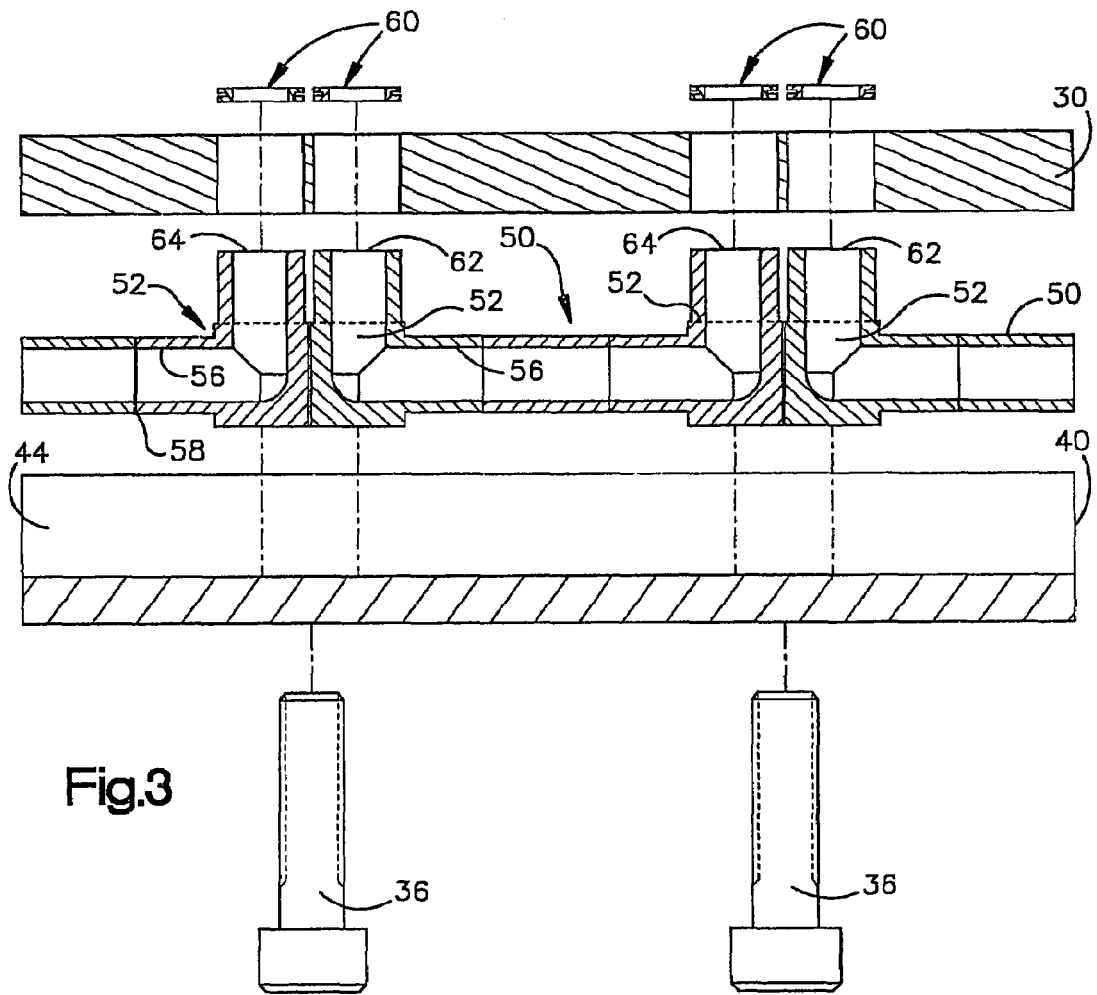
FIG. 3 is an exploded elevational view of a portion of the manifold of FIG. 2, showing one complete gas bridge located between two partially illustrated gas bridges and showing an optional representative seal.
Figure 3A:
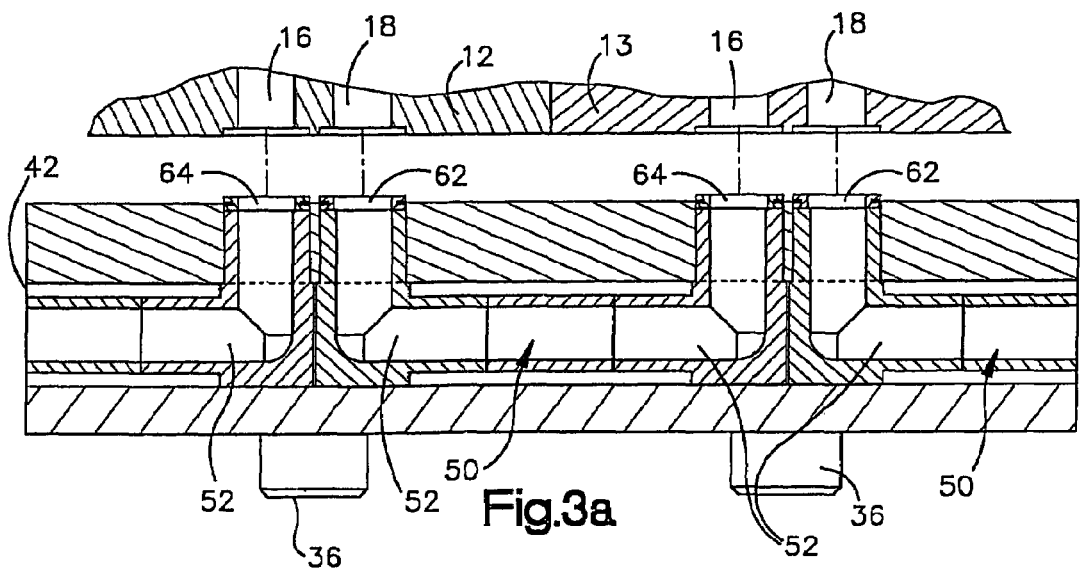
FIG. 3a is a cross-sectional view of the assembled manifold portion of FIG. 2.

An alternative embodiment of a bridge-tee fitting 70 is shown in FIG. 3*b*. This bridge fitting 70 may be used in conjunction with three adjacent fluid components, wherein the middle fluid component has only one inlet port, e.g., a pressure transducer. The bridge fitting 70 is comprised of two elbow fittings 52, each having an internal fluid passageway in fluid communication with a tee fitting 72. The tee fitting 72 has an inlet end 74, and two outlet ends 76, 78. Outlet end 76 of the tee fitting 70 is in fluid communication with the inlet of a single port fluid component such as a pressure transducer. The outlet end 78 of the tee fitting is in fluid communication with the outlet end 80 of the bridge fitting. Thus the bridge tee fitting 70 has an inlet end 82 and two outlet ends 76 and 80, and may be used to "bridge" or transfer the flow between three adjacent fluid components, wherein the middle fluid component has only a single port.

Figure 4:
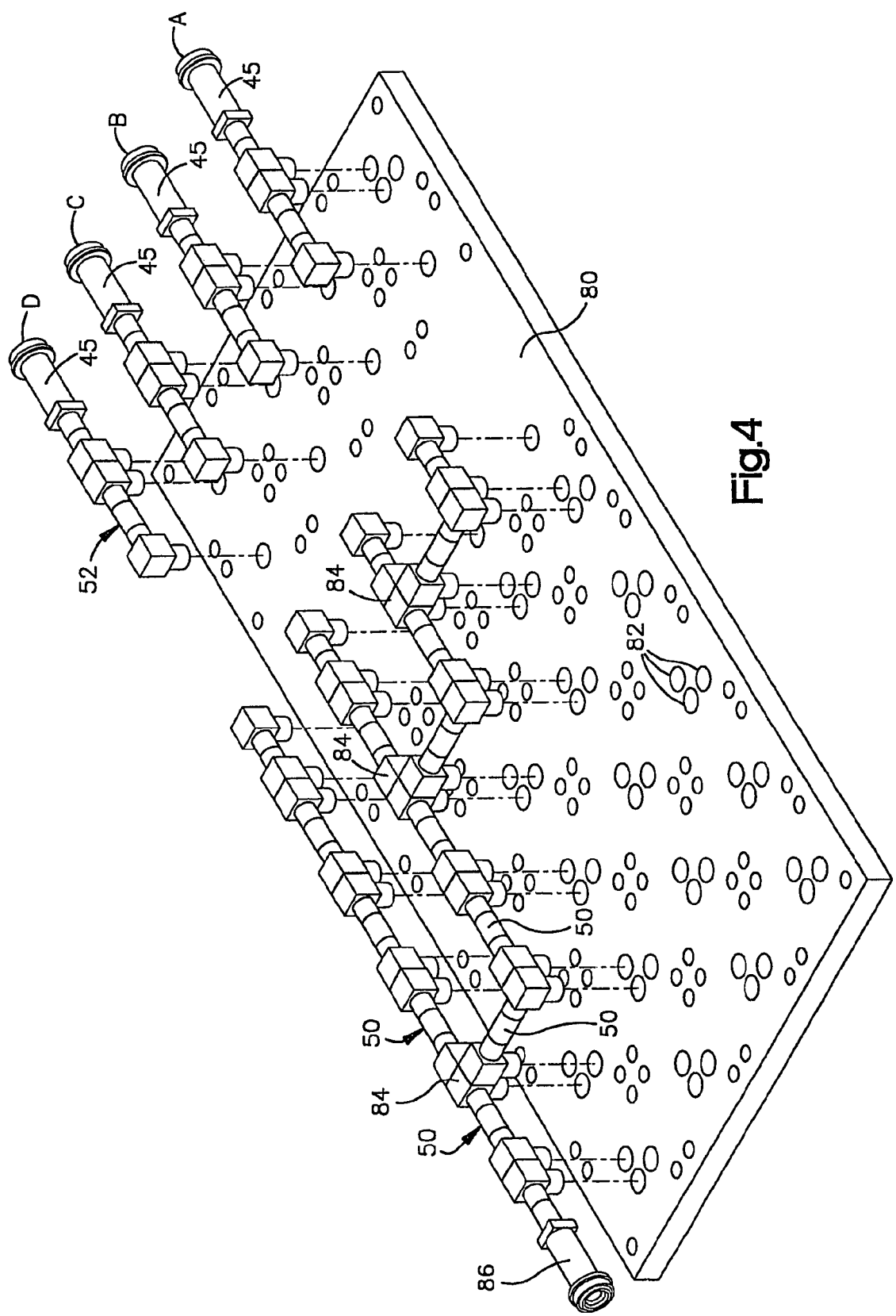
FIG. 4 is a perspective view of a alternative manifold system of the present invention which incorporates multiple flow paths extending in various directions.

FIG. 4 shows yet another embodiment of a locator plate 80 designed for use with fluid flowing in multiple flow paths A, B, C and D. In order to better illustrate the invention, the backside of the locator plate is shown with respect to the bridges 50 (i.e., the opposite of FIG. 2). The arrangement of the bridges 50 within the holes 82 of the locator plate allow for the combination or mixing of fluids from one or more flow paths. Thus as shown in FIG. 4, four independent flow paths are shown (A, B, C and D) which are mixed together in desired proportions by fluid components (not shown) which result in the fluid outlet 86 of the system to be comprised of the fluids A, B, C and D mixed in a desired proportion. This is accomplished by using a fluid component such as a valve having a three port configuration (at locations 84) in order to allow for the mixture of the different fluids from separate flow paths. Note that the bridge fittings 50 are combined in a "pegboard" style arrangement in order to achieve the desired result as described above. Thus bridges 50 are used to interlink or join the separate flow paths in order to achieve the fluid mixing, without the need for any specially adapted components. This is a distinct advantage over prior art block type modular designs, as a special block having three ports would be needed.

In this embodiment of the invention, the locator plate 80 may be used to both as a support for the bridges 50 and as a "locator" without the need for a support plate. The bridge fittings 50 may further comprise a threaded end (not shown) which can be inserted into aligned threaded holes 82 of the locator plate 80. The ends 62,64 of the bridge fittings 50 may also be press fit into the aligned holes 82 of the locator plate 80 or be attached by retainer clips (not shown) to the locator plate. Other attachment means may be readily apparent to those ordinarily skilled in the art.

In this embodiment of the invention, the ends 62,64 of the bridge fittings 50 may vary in height, with a height sufficient to allow multiple layers of bridge fittings (not shown).

This cross layer feature would be useful, for example, if it were desired to provide purge gas in Line A to the other gas lines B, C and D. In order to accomplish this, a modified bridge fitting 50 would be needed which would additionally comprise a tee fitting for mating with the bridge fitting of an upper layer. The tee fitting would be located between the elbow fittings as shown in FIG. 3*b*, and have an internal fluid passageway in communication with the internal fluid passageways of the elbow fittings. However, unlike FIG. 3B, the opening of the tee fitting would be 180 degrees opposite of the openings of the elbow fittings in order to mate with the tee fitting of a bridge fitting located in another layer. Thus this embodiment of the invention would result in a fluid manifold system having multiple fluid flow paths, with said paths being capable of extending in multiple directions. Further, this embodiment allows for multiple or three dimensional layering of gas flow paths, wherein the fluid flow paths of one layer may be in fluid communication with the fluid flow path of another layer(s).

In summary, the invention provides a bridge fitting which may be used to form a gas or fluid flow path in conjunction with fluid components which are preferably surface mount components. These bridge fittings eliminate the need for mating seals needed between adjacent blocks of the prior art, and they are much simpler and cheaper to manufacture. Further, the invention provides for easy installation of multiple fluid flow paths and fluid components in multiple directions and layers. The invention also provides for the interchangeability of fluid components while allowing easy access to the components for ease of maintenance.

While the preferred embodiments of the invention has been illustrated and described, it should be understood that variations will become apparent to those skilled in the art. Accordingly, the invention is not limited to the specific embodiments illustrated and described herein, but rather the true scope and spirit of the invention are to be determined by reference to the appended claims.

I claim:

1. A fluid manifold system for connecting two or more fluid components in fluid communication with each other, the manifold system comprising:
   one or more bridge fittings having an inlet end and an outlet end and an internal fluid passageway joining said ends; said inlet and outlet ends each comprising a respective bridge fitting port with said bridge fitting ports being coplanar with respect to each other;
   a support surface having at least two fluid components supported thereby, and a groove that is formed in and recessed from said support surface and that extends below said fluid components and that extends from end to end of said support surface, said one or more bridge fittings being disposed at least partially within said groove and providing fluid communication between said at least two fluid components, and said coplanar bridge fitting ports lie in a plane that is generally parallel said support surface.

2. The system of claim 1 wherein said one or more bridge fittings comprises coplanar ports that provide fluid communication between coplanar ports of said at least two fluid components.

3. The system of claim 1 wherein said support surface is disposed below a plate on which said fluid components are mounted.

4. The system of claim 1 wherein each said fluid component comprises a mounting surface that faces said support surface, each said fluid component comprising at least one fluid port formed in said mounting surface.

5. The system of claim 4 wherein each said fluid component comprising at least two fluid ports formed in said mounting surface, said at least two fluid ports being coplanar with respect to each other.

* * * * *

UNITED STATES PATENT AND TRADEMARK OFFICE
CERTIFICATE OF CORRECTION

PATENT NO. : 7,712,486 B2  Page 1 of 1
APPLICATION NO. : 12/150508
DATED : May 11, 2010
INVENTOR(S) : Paul G. Eidsmore It is certified that error appears in the above-identified patent and that said Letters Patent is hereby corrected as shown below:

On the title page, item (75) Inventor: Paul "E." Eidsmore should read --Paul G. Eidsmore--.

Signed and Sealed this

Third Day of August, 2010

David J. Kappos
*Director of the United States Patent and Trademark Office*